May 24, 1966 R. C. BUNTING 3,252,375
OPTICAL VIEWING SYSTEM WITH POLARIZED BEAM SPLITTING ELEMENT
Filed Aug. 14, 1961
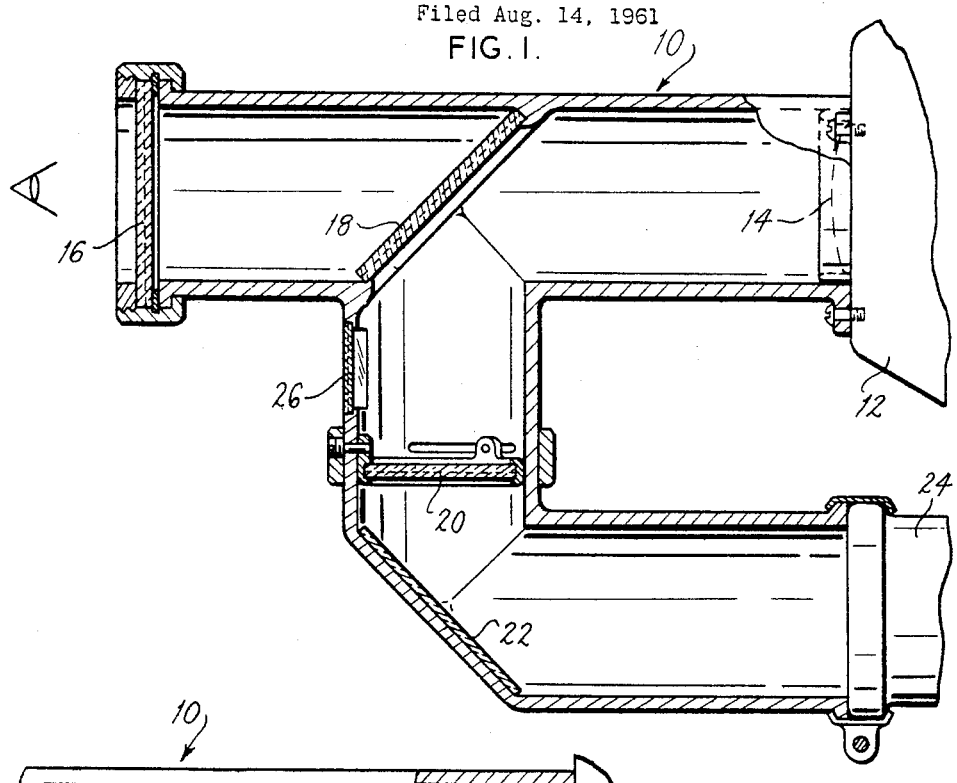
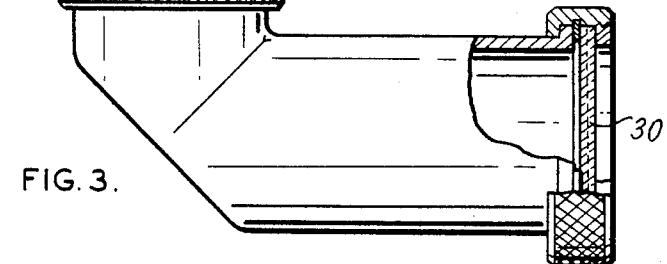
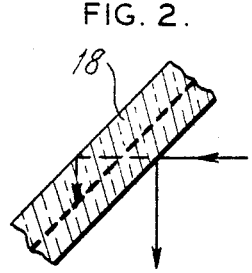
INVENTOR.
RUSSELL C. BUNTING
BY
Gravely, Lieder & Woodruff
ATTORNEYS

United States Patent Office 3,252,375
Patented May 24, 1966

3,252,375
OPTICAL VIEWING SYSTEM WITH POLARIZED BEAM SPLITTING ELEMENT
Russell C. Bunting, Florissant, Mo., assignor to McDonnell Aircraft Corporation, St. Louis, Mo., a corporation of Maryland
Filed Aug. 14, 1961, Ser. No. 131,296
5 Claims. (Cl. 88—65)

The present invention relates generally to beam splitting devices and is more specifically directed to improved means for viewing images and taking pictures thereof and is particularly well adapted for reviewing and photographing images appearing on cathode ray tubes such as are employed on radar gear and the like.

Various devices have been constructed in the past for viewing and photographing images appearing on radar scopes and the like. One of the main difficulties and shortcomings of such devices has been that they have permitted the introduction of stray light which produces glare and distortion and they also produce double images of the subject particularly when being photographed and for these and other reasons they have not been satisfactory and have produced low quality pictures. The present invention overcomes these and other disadvantages and shortcomings of the known devices by providing beam splitter means employing polarized elements arranged in a unique manner to eliminate stray light and prevent double images from being photographed.

It is therefore a principal object of the present invention to provide improved means for viewing and photographing images on cathode ray tubes such as are used in radar scopes and the like.

Another object is to minimize stray light and eliminate double images in an optical system.

Another object is to provide relatively inexpensive means for controlling light from an image to a camera.

Another object is to provide improved means by which an image may be simultaneously viewed and photographed.

Another object is to improve the quality of pictures taken of images appearing on cathode ray tubes and the like.

Yet another object is to provide improved means for controlling the brightness of an image.

These and other objects and advantages of the present invention will become apparent after considering the following detailed description of a preferred embodiment thereof in conjunction with the accompanying drawing wherein:

FIG. 1 is a diagrammatic view of an optical system including camera means for observing and photographing an image, such as an image appearing on a cathode ray tube;

FIG. 2 is an enlarged fragmentary cross-sectional view of the beam splitter element of the device shown in FIG. 1; and FIG. 3 is a diagrammatic view showing certain modifications in the optical system illustrated in FIG. 1.

Referring to the drawing by reference numbers, number 10 refers to an optical system for observing and photographing images appearing on a scope 12 such as a radar scope. The images appear on the face of the cathode ray tube 14 and are viewed by an observer through a pair of spaced linear polarized elements 16 and 18. The element 16 is mounted for rotational adjustment and the element 18 is mounted in fixed position but at an angle of approximately 45° relative to the element 16. The transmission axis of the polarized element 18 is orientated vertically relative to the scope screen as viewed by the operator, and the element 16 can be rotated to change the angular relationship of the transmission axes of the elements 16 and 18 in order to control the intensity of light reaching his eye from the images.

Positioned below the element 18 and in optical alignment therewith is another polarized element 20. The element 20 has its transmission axis orientated perpendicular to the plane of the paper as shown diagrammatically in FIG. 1, and below the element 20 is positioned a mirror or reflector 22 which redirects light coming down through the element 20 into a camera 24. The orientation of the transmission axis of the polarized element 20 is important to the invention as will be shown hereinafter.

The image light from the scope 12 strikes the right hand side of the element 18 and part of it passes through the element 18 and also through the element 16 to the eye of the observer. Part of the image light is also reflected downwardly by the mirror action of the right surface of the element 18. This downwardly reflected light passes through the element 20 which has its transmission axis orientated to pass this light, and then is reflected by the mirror 22 into the camera 24 where a picture of the image is taken.

Part of the light from the image also passes through the element 18 and tries to be reflected downwardly by the left surface thereof. This light, however, is prevented from passing downwardly because by being reflected it is plane polarized substantially at right angles to the transmission axis of the element 18 itself. The polarization of the element 18 therefore blocks this reflected light altogether, and none is able to get through the element 18 to the element 20 and to the camera 24. This action of the element 18 in eliminating a second downward reflection is important to the operation of the subject device and is the feature of the device which prevents photographic distortion caused by double images. This feature is illustrated by the enlarged fragmentary view of element 18 shown in FIG. 2. In FIG. 2 the scope image is shown being reflected downwardly by the right surface of the element 18 and the light that passes through the element 18 is cut off because its orientation is perpendicular to the transmission axis of the element 18 itself.

To better understand the operation of applicant's device, consider an image such as an object placed on a table in front of an observer. Now place a plane polarized element ahead of the observer's eye and above the object. Consider further that the element is tilted at an angle so that the object can be seen reflected on the near surface of the element. Now, rotate the element in its plane to change the angular orientation of the transmission plane of the polarized element and it will be observed that in certain positions two images will be seen and in other positions only a single image will be observed. Upon further investigation it will be found that the single image condition is observed when the transmission axis of the element is orientated in a particular way, for example, vertically relative to the eyes of the observer. The reason for this is that in this position substantially the only image light reflected to the observer from the object is the image reflected from the closer surface of the element. The image reflected from the opposite surface of the element, which ordinarily produces the undesirable double image, is reduced or eliminated by the orientation of the transmission axis of the element 18. The reason for this is that the greater part of the light coming from the image in passing through the element is polarized parallel to the transmission plane of the element. This light will also be attenuated to some extent. Of the light that passes through the element, however, only a portion will be reflected by the opposite or far surface of the element toward the eye of the observer to produce a double image.

Of the light that gets through the element a greater amount will be polarized parallel to the transmission axis of the element itself than otherwise. This is also the portion that is capable of being reflected. However, if the transmission plane of the element is orientated perpendicular to this portion of the reflected light, practically none of the reflected light can get through the element a second time to produce a double image. The small amount of reflected light that may finally get through the element a second time is so minute that it cannot be seen by the naked eye or photographed under normal exposure conditions. This has been proven in actual practice.

It is important for a full understanding of the invention to remember that reflected light by its very nature is polarized. This is important to the present device because it means that the light reflected downwardly from both surfaces of the element 18 is polarized but only that portion reflected from the left surface is blocked by the beam splitter element 18 while the portion reflected from the right surface is polarized to pass through the element 20. If, however, the element 20 were orientated at right angles to that shown then, of course, no light would reach the camera.

The element 20 in addition to controlling the light to the camera also serves to attenuate the stray light that has entered the system. This is so because the stray light entering the system must pass both through the element 18 and also through the element 20 and since these elements have their transmission axes orientated at right angles, no stray light can get through them to the camera.

If desired for purposes of maintenance or otherwise a window 26 can be positioned in the wall of the subject device. The window 26 is also a linear polarized element and is mounted to have its transmission axis orientated at right angles to the transmission axis of the element 20. Such a window will enable internal examination and inspection but will not permit stray light to reach the camera.

In FIG. 3 there is shown a modification which can be used when it is desired to provide another viewing window 30 in place of the camera 24. This will be useful when visual observation at window 30 is desired for comparing with visual observation at the element 16. Also, FIG. 3 shows the use of a polarized element 28 in front of the scope tube 14 to reduce stray light and to attenuate the light. Obviously, element 28 may be used in FIG. 1, and the observation window 30 may likewise be used with other items of the system. In practice it has been found that if the circularly polarized elements 28 has its transmission axis orientated at about 45° relative to the transmission axis of the element 18 that good balance is obtained between the intensity of light reaching the observer and the camera or the window 30 and the observer at the element 16.

Thus there has been shown and described novel beam splitter means for optical systems such as an optical system for observing and photographing images on scopes and the like which fulfill all of the objects and advantages sought therefor. It is anticipated, however, that many optical and structural changes and modifications could be made and many uses in addition to those described could be found for the subject device without departing from the spirit and scope of the invention. All such changes, modifications and new uses which do not depart from the spirit and scope of the invention are deemed to be covered by the invention which is limited only by the claims which follow.

What is claimed is:

1. In an optical system having a pair of spaced viewing stations and a light producing image, the improvement comprising a linear polarized element positioned between the image and one of the viewing stations, part of the light from the image passing through the element to said one viewing station, said polarized element being positioned at an oblique angle relative to the incident light it receives from the image, and said element having spaced opposite light reflective surfaces orientated to reflect image light impinging thereon to the other of the spaced viewing stations, said polarized element having its transmission axis orientated in a direction substantially parallel to the plane of incidence of the light from the image to substantially eliminate image reflections from the surface thereof remote from the image toward the other viewing station.

2. In the optical system defined in claim 1, light intensity control means including a second linear polarized element positioned between the image and said one viewing station, said control means including means for rotating said second element to vary the angular relationship between the transmission axes of the polarized elements and the intensity of the light reaching said one viewing station from the image.

3. In the optical system defined in claim 1, a second linear polarized element positioned between the aforesaid polarized element and the other viewing station, said second polarized element having a transmission axis orientated to be substantially normal to the transmission axis of the aforesaid element.

4. In the optical system defined in claim 3, a housing having a first portion extending between the image and one of the viewing stations, said linear polarized element being mounted in said first portion, and a second housing portion angularly related to the first housing portion extending between the linear polarized element and the other viewing station, said other viewing station including light sensitive means, and means in the housing at an intermediate location for inspecting the inside thereof, said last named means including an opening into the housing and a third linear polarized element mounted in said opening, said third element having its transmission axis orientated substantially normal to the transmission axis of said second linear polarized element.

5. An image splitting device to provide spaced viewing stations for observing a common image comprising means creating an image to be viewed, spaced viewing stations remote from said image creating means, a beam splitting element positioned optically between the image creating means and one of said spaced viewing stations, said beam splitting element including a linear polarized element having spaced light reflecting surfaces orientated at an oblique angle relative to light coming thereto from the image to reflect part of the image light impinging thereon toward the other spaced viewing station, part of said image light passing through said element to said one viewing station, said linear polarized element having a transmission axis orientated at an angle substantially parallel to the plane of incidence of the image light impinging thereon to substantially eliminate image reflections from the surface thereof remote from the image toward the other spaced viewing station.

References Cited by the Examiner

UNITED STATES PATENTS 2,178,145 10/1939 Manly _____ 88—65
2,372,430 3/1945 Kals _____ 88—1
2,537,040 1/1951 Doyle et al. _____ 346—107

DAVID H. RUBIN, *Primary Examiner.*

JEWELL H. PEDERSEN, *Examiner.*

J. S. GOLDHAMMER, *Assistant Examiner.*